United States Patent [19]

Keller et al.

[11] 4,417,123

[45] Nov. 22, 1983

[54] LASER FORMED VIDEO TUBE CALIBRATION MARKERS

[75] Inventors: Patrick N. Keller, Ridgecrest; Jerome B. Franck, China Lake; George G. Silberberg, Ridgecrest, all of Calif.

[73] Assignee: The United States of America as represented by the Secretary of the Navy, Washington, D.C.

[21] Appl. No.: 280,767

[22] Filed: Jul. 6, 1981

[51] Int. Cl.³ .............................................. B23K 27/00

[52] U.S. Cl. ....................... 219/121 LH; 219/121 LQ; 219/121 LS; 219/121 LZ

[58] Field of Search .................. 219/121 LH, 121 LJ, 219/121 LQ, 121 LS, 121 LY, 121 LZ; 346/76 L

[56] References Cited

U.S. PATENT DOCUMENTS

| | | | |
|---|---|---|---|
| 3,902,036 | 8/1975 | Zaleckas | 219/121 LM X |
| 4,323,755 | 4/1982 | Nierenberg | 219/121 LJ |

*Primary Examiner*—C. L. Albritton

*Attorney, Agent, or Firm*—R. F. Beers; W. Thom Skeer; W. D. English

[57] ABSTRACT

An apparatus for forming fiducial marks on an imaging surface of a video tube comprising a laser system that outputs an alignment focused beam and a pulsed focused beam upon command, a driven jig positioner that holds and moves the video tube, a controller programmed to move the jig in a predetermined manner so that fiducial marks are formed on the tube in a desired pattern, and video monitoring means for observing said focused beams on the imaging surface.

15 Claims, 1 Drawing Figure

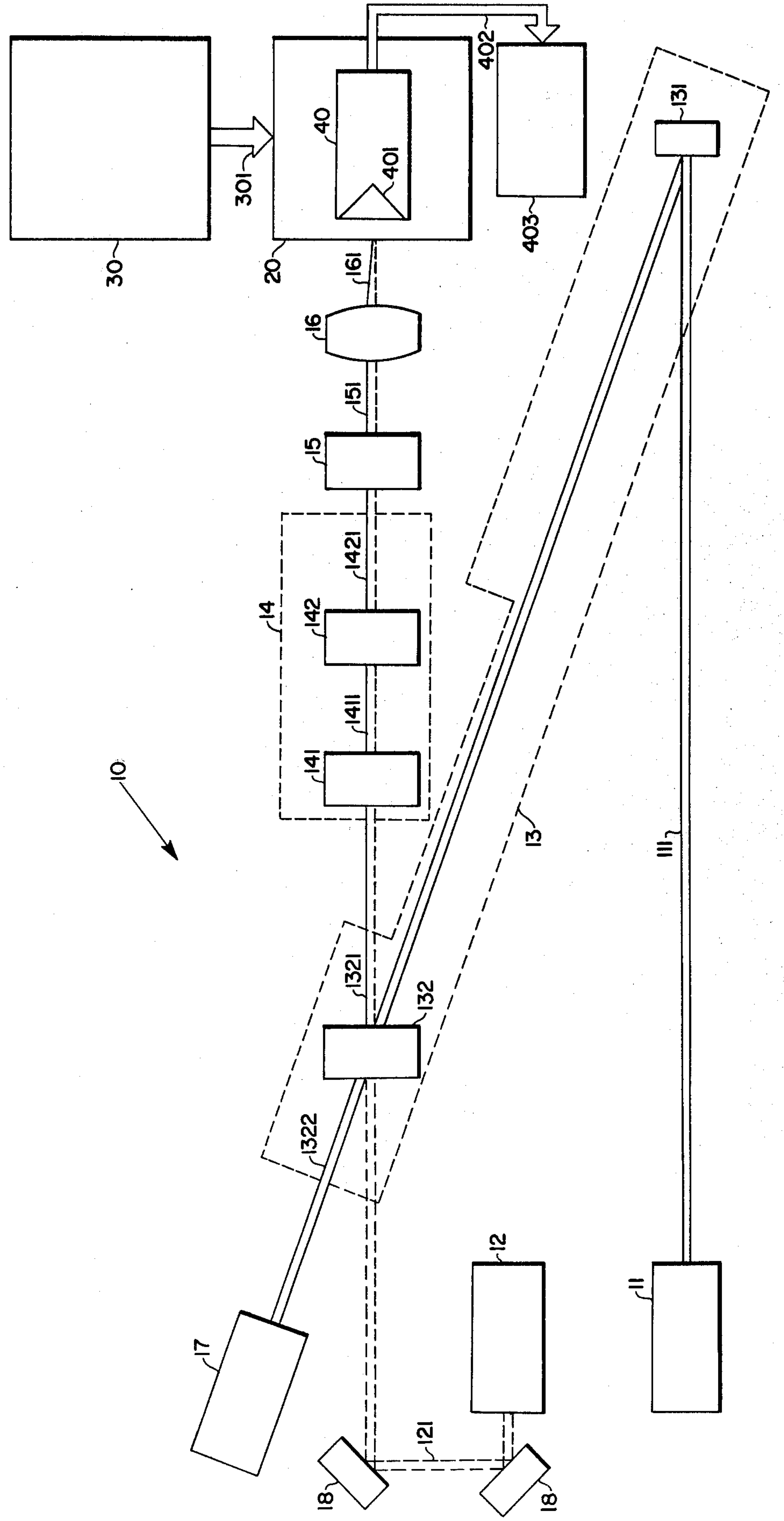
30
301
20
40
401
402
403
161
16
151
15
14
142
1421
141
1411
10
13
131
132
1321
1322
111
11
12
121
17
18
18

LASER FORMED VIDEO TUBE CALIBRATION MARKERS

BACKGROUND OF THE INVENTION

1. Field of the Invention

This invention relates to video cameras, more particularly, to a process of forming fiducial marks on an imaging surface of a video tube, and the use of the video tubes so marked.

2. Description of the Prior Art

In general, video cameras are used to make geometric measurements, and in particular at Naval Weapons Center, China Lake, Calif., video cameras have been used for many years for weapons impact scoring, fuse function measurements, miss distance, velocity measurements and trajectory measurements, but the poor geometric properties of the tube type video imagers have been a problem. Usually, several markers are needed in the field of view to give scale and usually it is not practical to have enough markers to make non-linearity corrections. Also, it is common that some marker is needed to designate target center.

Video cameras using solid state imagers have also been used to measure weapons impact and fuse scoring. Geometry and scale are essentially perfect, but the cameras have much poorer resolution, less automatic light control range, noise at high temperatures, poor external sync locking, poor blooming characteristics (low blooming threshold and coulomb blooming) and higher production expenses. The overall advantage of using the present generation of commercially available solid state cameras versus tube imager cameras for weapons impact and fuse scoring is doubtfull as to the present intended purpose.

One prior process of forming fiducial marks on video tubes used a mechanical scribing device. This process had to be accomplished only during manufacturing of the tubes. This failed to satisfy customer requirements as to particular markings required, and further committed the video tubes so marked to that use without knowing customer demands. Tailoring manufacturing to customer requirements and demands is not economical. A process of marking video tubes already possessed by customers removes these manufacturing detractors.

Additionally, mechanical scribing of the imaging surface has resulted in fiducial marks of low quality; lacking sharpness and accuracy in position.

Further, video tube imagers lack linearity and the scale of the image produced is variable across the field of view. A process to compensate for this lack by placing fiducial marks on the imaging surface for compensation is needed.

Other processes for placing fiducial marks on images formed by video tubes is by electronic insertion or by using film with marks. Both of these techniques fail to compensate for geometric distortion caused by video tubes or for inadequacy of determining the true geometric scale of the video tubes. Both require additional expenses such as purchasing high cost video cameras with better linearity and scale characteristics.

SUMMARY OF THE INVENTION

A process and apparatus for forming fiducial marks on video tubes is disclosed. The apparatus used to form the fiducial marks consists of a laser system, a driven jig, a microprocessor controller for the jig a monitoring means. The laser beam is static while the video tube is moved in front of the laser system to produce the desired marks.

The laser system consists of a medium power 1.06 Neodymium YAG pulsed laser, a low power helium-neon laser, a detector for measuring pulsed beam intensity, optics to coaxially align the beams, fixed and variable attenuators and a lens. The continuous helium-neon beam, operated in the visible region, is used for spotting and focusing. The YAG beam is used for burning the fiducial marks on the video tube imaging surface.

The driven jig consists of precision slides driven by stepper motors in the horizontal and vertical direction. Manual adjustment fore and aft is used for focusing. Position accuracy is achieved by precision lead screws and high resolution stepper motors. Slide movement is 0.000125 inches per step. Precision needed to achieve a grid accurate to one part per thousand on a one inch tube (0.5 inch wide scan) is 0.0005 inches. The tube is mounted in a camera on the jig so that focusing may easily be achieved and the effects of each burn shot may be observed by video monitoring means such as a video monitor or a video waveform analyzer. The high voltage section of the camera is turned off each time before the YAG laser is fired.

The microprocessor controller for the stepper motors moves the video tube in a precise pattern in front of the laser system. The controller stops and notifies the operator at each point to be burned. Different fiducial patterns are achieved with different programs. The controller moves the jig in such a way so as to eliminate backlash errors by the lead screws by approaching each point from the same direction.

One object of this invention is a process of forming fiducial marks on the imaging surface of video camera tubes.

Another object of this invention is a video tube having fiducial marks formed in a rectangular grid pattern and being used for range testing.

A further object of this invention is a low cost video tube having an array of laser formed fiducial marks formed on the imaging surface of the tube after manufacture of the tube.

A still further object of this invention is a video tube having an array of laser formed fiducial marks formed on the imaging surface so that distortion can be compensated for during analysis of the video pictures.

Other objects, advantages, and new features of the invention will become apparent from the detailed description when considered in conjunction with the drawings and the claims.

BRIEF DESCRIPTION OF THE DRAWING

The FIGURE is a schematic view of the apparatus used in the process of forming fiducial marks on a video tube.

DESCRIPTION OF THE PREFERRED EMBODIMENT

The FIGURE illustrates the apparatus for forming fiducial marks on video tubes by use of a laser beam.

The apparatus for forming fiducial marks on a video tube 401 is composed of a laser system 10, a driven jig 20, a controller 30, and a video monitoring means 403.

Laser system 10 is composed of a pulsed laser 11, an alignment laser 12, pulsed beam turning mirrors 13, a prism attenuator 14, a bulk attenuator 15, a lens 16, and a detector 17.

A Q-switched neodymium YAG laser 11 operating in the TEMOO mode emits a pulsed beam 111 of about 9 nsec. pulse width upon operator command. This beam has a wavelength of 1.06 microns and is invisible to the eye. Emitted pulsed beam 111 reflects off of a first turning mirror 131 which has a dielectric coating on the front reflecting surface. This reflected pulsed beam 111 is then incident upon a second turning mirror 132.

In order to insure proper focusing of pulsed beam 111 upon video tube 401, a He-Ne alignment laser 12 emits a visible continuous alignment beam 121. Alignment beam 121 is reflected off of turning mirrors 18 having an aluminium front surfaced mirrors. Reflected alignment beam 121 is then incident upon second turning mirror 132. The dielectric surface deposited on second turning mirror 132 transmits alignment beam 121 but reflects pulsed beam 111. By proper alignment of turning mirrors reflected pulsed beam will be centered on transmitted alignment beam.

An aligned beam 132 being either alignment beam 121 or pulsed beam 111 is output by second turning mirror 132. Alignment beam 121 is larger in diameter than the pulsed beam 111 and laser system 10 is adjusted so that pulsed beam 111 is centered on alignment beam 121.

The aligned beam 132 is incident upon a Glan Thomson prism attenuator 14 which is composed of a polarizer 141 and an analyzer 142. By adjusting the angle of rotation of polarizer 141 the intensity of output polarized beam 1411 is controlled. Analyzer 142 allows only a particular polarizaiton to pass thus resulting in an analyzed beam 1421. This is incident upon a bulk attenuator 15 which is used to adjust intensity in large increments either up or down in value. An attenuated beam 151 is output from bulk attenuator 15, and is incident upon lens 16 which is used to focus attenuated beam 151 onto the image forming surface of video tube 401 of video camera 40. The lens must be of short focal length so that spots of approximately 6 microns diameter are formed. A lens with a 26 mm. focal length was used. Because alignment beam 121 and pulsed beam 111 are of different wavelengths, the focusing points will differ slightly, but not significantly.

Detector 17 is used to monitor the intensity of pulsed beam 111. The dielectric surface of turning mirror 132 allows approximately one percent or less of pulsed beam 111 to be transmitted as transmitted pulsed beam 132. By placing a calibrated detector in the position of video camera 40, the intensity of transmitted pulsed beam 1322 can be directly related to intensity of focused beam 161 when pulsed laser 11 emits a pulse. Alignment beam 121 would not be present during this calibration procedure.

Driven jig 20 is a three-axis positioner. It consists of precision slides driven by stepper motors. The z-axis moves parallel to the axis of focused beam 161 and is controlled manually. By viewing the image of focused beam 161 and adjusting the z-axis until the size of the spot is optimized insures that pulsed beam 111 will also be optimized as to the spot formed by it. Position accuracy is achieved by precision lead screws and high resolution stepper motors. Slide movement is 0.000125 inches per step. The precision needed to achieve a grid accuracy to one part per thousand on a one inch tube (0.5 inches wide scan) is 0.0005 inches.

The x and y axis are orthogonal to each other and also perpendicular to the axis of focused beam 161.

The movement of the stepper motors is controlled by a microprocessor in controller 30. A program controls the pattern of the fiducial marks and is changed to suit any desired. Controller 20 notifies the operator when it has reached the next position whereupon the operator triggers the pulsed laser 11 to fire. After the desired number of shots, the operator signals controller 30 to move the driven jig 20 by control signals 301.

The operator can view the results of each firing through said video monitoring means. As shown in FIG. 1, video tube 401 is installed in video camera 40 which transmits video signals 402 to a video monitor, not shown. Also video signals 402 can be input to a video waveform analyzer, not shown, operated in conjunction with the video monitor to obtain additional information about the fiducial mark formed. By viewing the video monitoring means, the operator can selectively change focusing and intensity so as to achieve controlled altering of the photosensitive material deposited behind the front glass surface of video tube 401 where an image is formed so that fiducial marks appear in the image so formed.

The process of forming fiducial marks on video tubes is as follows: (1) Laser system 11 and driven jig 20 are properly aligned wherein focused beam 161 is parallel to the Z-axis; (2) detector 17 is calibrated; (3) a video camera is placed on driven jig 20 and a video tube is centered on focused beam 161 so that the horizontal and vertical video tube axes correspond to the X and Y-axis of jig 20; (4) a desired fiducial pattern is programmed into controller 30; (5) laser system 11 is adjusted so that a fiducial mark, spot, is formed after a given number of pulses on the unused portion of the video tube imaging surface; (6) controller 30 sequences driven jig 20 to each position; and (7) after which the operator triggers a number of pulses to optimize the spot diameter by observing video monitoring means and detector 17 to determine the adjustment to the apparatus. After the initial run as noted above, step (3), (6), and (7) need only be performed if the tube type does not change.

This process has been successfully on Vidicon, Newvicon and Plumbicon tubes. Using the rectangular grids produced, the geometric distortion of a typical video camera is found to be complex. In general distortion is not symmetric top to bottom or left to right. It is not the same at the top edge as at the bottom edge or left edge as compared to the right edge. This geometric distortion besides producing nonlinearities in scale, also produces non-orthogonalities. A polynominal is used to achieve corrected scales along the top, bottom, left and right edges. Linear interpolation is then used to correct the reading of any given x, y position.

Using the laser formed fiducial marks, scale markers are no longer needed in the field on the ranges. Indeed, even fixed points of reference may be removed from the target area if the cameras are rigidly mounted. Reading the calibration grid takes about 25 seconds using cursor prompting. The computer jumps the cursor to the next expected position of the grid after each reading is entered. Computing new polynomial coefficients takes about 7 seconds. Corrections to any subsequent reading takes less than a second. Typically camera calibration is quite stable after warm up. In many applications calibration updating need not to be done more frequently than hourly. However calibration may be done on every field of stop action playback if desired.

Laser formed video fiducial marks offer a low cost way to obtain excellent geometric measurements from tube type video imagers. In many applications such as weapons impact scoring and fuse function measurements, a tube camera with laser formed calibration markers is preferable to the current generation of solid state imager cameras.

Thus, the above description taken together with the following claims constitute a disclosure such as to enable a person skilled in optics having the benefit of the teachings herein to make and use the invention described herein. Further, the invention described herein constitutes an unobvious advance to such a person not having the benefit of this disclosure.

What is claimed is:

1. An apparatus for forming fiducial marks on an imaging surface of a video tube, comprising:
   - a laser system for producing and directing an alignment focused beam and a pulsed focused beam, upon command, along an optical path;
   - a driven jig positioned for holding said imaging surface of said video tube on said optical path;
   - a controller connected to said driven jig and programmed to move said driven jig in a predetermined manner; and
   - video monitoring means coupled to said video tube for observing said alignment focused beam and the effects of said pulsed focused beam on the imaging surface of said video tube.

2. An apparatus as in claim 1, wherein said laser system comprises:
   - a pulsed laser for emitting a pulsed beam upon command;
   - an alignment laser for emitting an alignment beam;
   - means for aligning said pulsed beam and said alignment beam;
   - a detector for measuring the intensity of said pulsed beam;
   - a prism attenuator for receiving said aligned beam and for outputting an analyzed beam;
   - a bulk attenuator fo receiving said analyzed beam for outputting an attenuated beam; and
   - a lens for receiving said attenuated beam and for outputting a focused beam that impinges on the imaging surface of said video tube held by said driven jig.

3. An apparatus as in claim 2, wherein said pulsed laser comprises a Q-switched neodymium YAG laser outputting said pulsed beam at 1.06 microns wavelength and operating in the TEMOO mode.

4. An apparatus as in claim 2, wherein said alignment laser is a He-Ne laser.

5. An apparatus as in claim 2, wherein said means for aligning comprises pulsed beam turning mirrors and alignment beam turning mirrors.

6. An apparatus as in claim 5, wherein said pulsed beam turning mirrors comprises a first and second turning mirror, said first turning mirror receiving said pulsed beam from said pulsed laser and reflecting said pulsed beam to said second turning mirror, said second turning mirror having said pulsed beam incident on a dielectric coating side and said alignment beam incident on a side opposite the dielectric coating side, outputting an aligned beam from the dielectric coating side, said aligned beam being either said pulsed beam or a part of said alignment beam transmitted by said dielectric coating, said aligned beams centered to have a common axis.

7. An apparatus as in claim 2, wherein said prism attenuator is a Glan Thomson prism attenuator comprising a polarizer and an analyzer.

8. An apparatus as in claim 2, wherein said lens is of short focal length so that said pulsed aligned beam forms a spot of 4 to 8 microns in diameter.

9. An apparatus as in claim 8, wherein said lens has a focal length from 30 mm to 20 mm.

10. An apparatus as in claim 1, wherein said driven jig comprises a three-axis positioner, having a z-axis parallel to the axis of said focused beam, having an x and y-axis perpendicular to said z-axis and orthogonal to each other, said video tube aligned on said positioner so that said x and y-axis correspond to a horizontal and vertical axis of a video picture formed by said video tube.

11. An apparatus as in claim 10, wherein said controller comprises a microprocessor programmed to direct the x and y-axis movement of said driven jig in a predetermined manner.

12. A process of forming fiducial marks on a video tube comprising the steps of:
   - aligning a laser system to output an alignment focused beam and a pulsed focused beam upon command;
   - aligning a driven jig so that one axis of said jig is parallel to said focused beams;
   - calibrating a detector that measures the intensity of said pulsed focused beam;
   - aligning said video tube on said driven jig so that said alignment focused beam forms a spot on an imaging surface of said video tube and moves parallel or perpendicular to a horizontal of said video tube;
   - programming a controller to move said driven jig in a predetermined pattern;
   - adjusting said laser system to form an optimum sized fiducial mark on said video tube after a number of pulses of said pulsed focused beam as determined by examining video monitoring means;
   - commanding said controller to move said driven jig to a predetermined position in said pattern;
   - triggering said pulsed laser to pulse at said predetermined position of said driven jig; and
   - repeating said adjusting, commanding, and triggering steps until a fiducial pattern is formed on said video tube.

13. A process of forming fiducial marks as in claim 12, wherein the step of adjusting said laser system, said optimum sized fiducial mark is a spot 4 microns to 8 microns in diameter.

14. Apparatus for forming fiducial marks on an imaging surface of a video tube, comprising:
   - laser means for producing and directing an alignment focused beam and a pulsed focused beam, upon command, along an optical path, having:
   - a pulsed laser for emitting a pulsed beam upon command;
   - an alignment laser for emitting an alignment beam;
   - means for aligning said pulsed beam and said alignment beam;
   - a detector for measuring the intensity of said pulsed beam;
   - a prism attenuator for receiving said aligned beams and for outputting an analyzed beam;
   - a bulk attenuator for receiving said analyzed beam and for outputting an attenuated beam; and
   - a lens for receiving said attenuated beam and for outputting a focused beam that impinges on the imaging surface of said video tube;
   - jig means for holding said imaging surface of said video tube on said optical path, having:

a three-axis positioner wherein a z-axis is parallel to the axis of said focused beam, and an x-axis and y-axis are perpendicular to said z-axis and to each other in such manner as to correspond to a horizontal and vertical axis of a video picture formed on said video tube; and a microprocessor programmed to direct said x-axis and said y-axis movement of said jig means in a predetermined manner; and video monitoring means coupled to said video tube for observing said alignment focused beam and the effects of said pulsed focused beam on the imaging surface of said video tube.

15. An improved video tube for a video camera system to be used in a video based measurement system, wherein the improvement comprises a video tube having circular spot fiducial marks of a diameter from 4 to 8 microns, laser formed on the imaging surface of said video tube.

* * * * *

UNITED STATES PATENT AND TRADEMARK OFFICE

Certificate

Patent No. 4,417,123 Patented November 22, 1983

Patrick N. Keller, Jerome B. Franck and George G. Silberberg

Application having been made by Patrick N. Keller, Jerome B. Franck and George G. Silberberg, the inventors named in the patent above identified, and the United States of America as represented by the Secretary of the Navy, the assignee, for the issuance of a certificate under the provisions of Title 35, Section 256, of the United States Code, adding the name of Rictor A. Swing as a joint inventor, and a showing and proof of facts satisfying the requirements of the said section having been submitted, it is this 12th day of June, 1984, certified that the name of the said Rictor A. Swing is hereby added to the said patent as a joint inventor with the said Patrick N. Keller, Jerome B. Franck, and George G. Silberberg.

Fred W. Sherling,
*Associate Solicitor.*